United States Patent
Jones

[11] 3,841,432
[45] Oct. 15, 1974

[54] SAFETY DEVICE FOR VEHICLES

[76] Inventor: Thomas Jones, 7134 Normal Blvd., Chicago, Ill. 60621

[22] Filed: May 18, 1973

[21] Appl. No.: 361,769

[52] U.S. Cl. ............................... 180/91, 280/150 B
[51] Int. Cl. .......................................... B60r 21/06
[58] Field of Search............ 180/91, 90; 280/150 B; 296/84 K

[56] References Cited
UNITED STATES PATENTS

| | | | |
|---|---|---|---|
| 2,853,339 | 9/1958 | Lazarus | 280/150 B |
| 2,907,602 | 10/1959 | Lagerling | 280/150 B |
| 2,970,862 | 2/1961 | Racine | 180/91 |

FOREIGN PATENTS OR APPLICATIONS 539,705  7/1955  Belgium .......................... 280/150 B

*Primary Examiner*—Kenneth H. Betts
*Assistant Examiner*—Jack D. Rubenstein

[57] ABSTRACT

A soft heavily padded member is normally disposed horizontally above the instrument panel of a vehicle and extends transversely to the longitudinal direction of the vehicle. Linkage mechanisms respond to front impact or collision of the vehicle to pivot the member into vertical position to protect the heads of the occupants in the front seat from impact with windshield or panel and cradle same by absorbing impact.

4 Claims, 2 Drawing Figures

SAFETY DEVICE FOR VEHICLES

SUMMARY OF THE INVENTION

My invention is directed toward a safety device for vehicles. Occupants of the front seat of a vehicle, upon front impact or collision can be thrown forward and their heads can strike the windshield or instrument panel whereby serious injury or even death can ensue.

To avoid these hazards, I install a soft heavily padded member in such manner that it is stored out of the way when the vehicle is in normal use but is automatically swung into position to be interposed between the occupants heads and the panel and windshield to absorb impact of the heads without injury thereto.

The member normally extends horizontally across the top of the panel in a direction transverse to the longitudinal direction of the vehicle. Linkage mechanisms, actuated by front impact or collision cause the member to be pivoted into a vertical plane while continuing to extend horizontally. The member is thus placed in desired impact absorbing position.

DETAILED DESCRIPTION OF PREFERRED EMBODIMENTS

Figure 1:
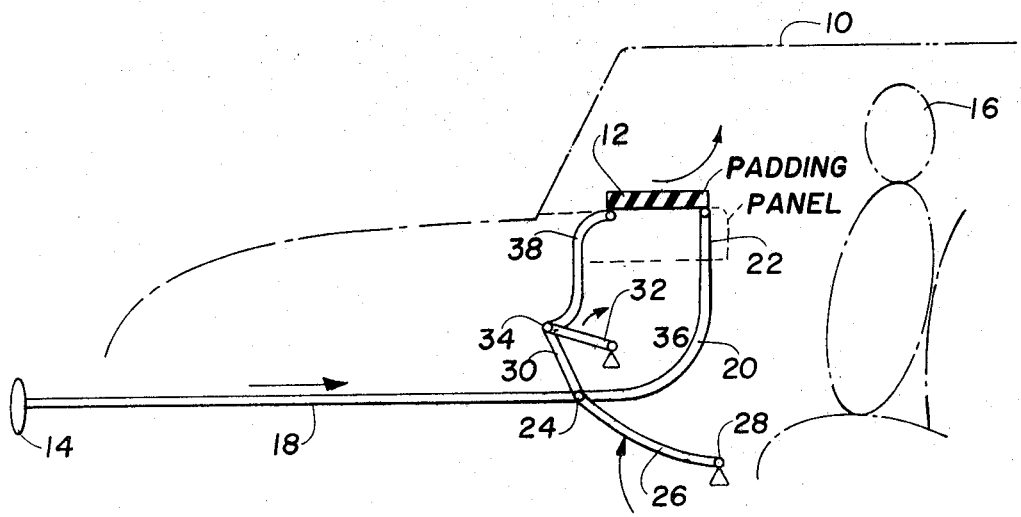
FIG. 1 shows my invention ready for use.
Figure 2:
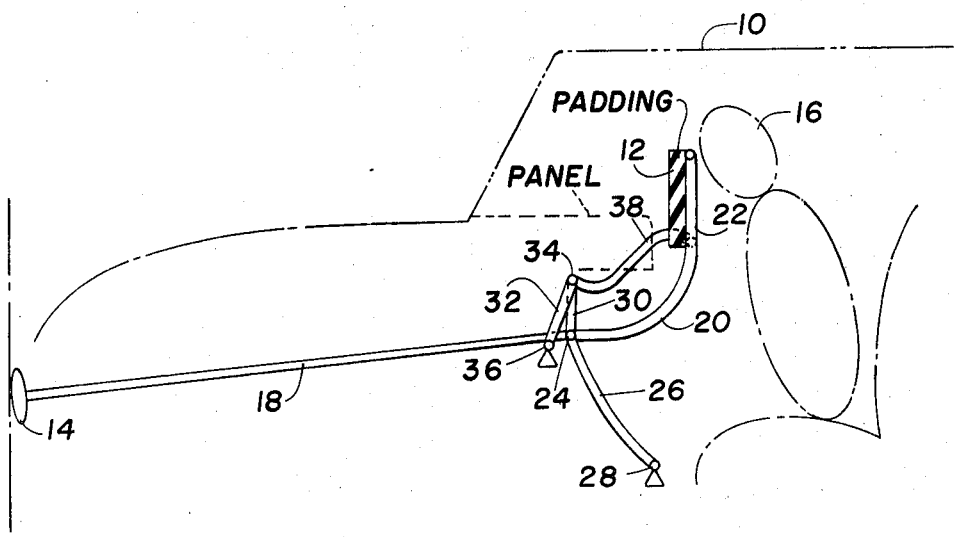
FIG. 2 shows my invention in use.

Referring now to FIGS. 1–2, a vehicle 10 has a soft heavily padded impact absorbing member 12 which normally lies in a horizontal plane on top of the instrument panel and extending in a direction perpendicular to the direction of elongation or longitudinal direction of the vehicle.

The purpose of my invention, upon impact at the front bumper 14, is to swing member 12 into a vertical plane whereby a passenger's or driver's head 16 will strike the member rather than the panel or windshield and will be protected from injury by the soft heavy padding.

An elongated generally L shaped element has an elongated horizontal arm 18 secured at a free end to the bumper and extending rearward to the region of the instrument panel where it is connected by radius 20 rather than a right angle to the bottom of vertical arm 22. Arm 22 is also covered by heavy soft padding. The upper end of arm 22 is pivotally secured to the front edge of the member.

Arm 18 at a point 24 adjacent the radius is pivotally secured to the upper end of slightly curved linkage 26. The lower end of linkage 26 is pivotally secured to a fixed point 28 on the chassis disposed below arm 18.

A short straight linkage 30 is pivotally secured at its lower end to point 24. The upper end of linkage 30 is pivotally connected to the upper end of linkage 32 at point 34. The lower end of linkage 32 is pivotally secured to fixed point 36 or the chassis. Point 36 is disposed above point 28 and normally above arm 18.

An S shaped vertically inclined linkage 38 is pivotally secured at its lower end to point 34 and at its upper end to the rear edge of member 12.

Upon front impact, arm 18 is pushed rearward and is raised at point 24 due to the action of linkage 26. At the same time, arm 22 is raised, raising the front edge of member 12. This action pulls linkage 26 forward, swinging linkages 32 and 30 into the position shows whereby the lower edge of the member 12 is disposed below the upper edge and the member 12 is disposed vertically for protection as described.

While I have described my invention with particular reference to the drawings, such is not to be considered as limiting its actual scope.

Having thus described this invention, what is asserted as new is:

1. In a vehicle, in combination:
a heavily padded member which in a first normal position is disposed horizontally along the top of the instrument panel and extends transversely to the direction of elongation of the vehicle;
a first generally L-shaped element lying in a vertical plane; the element having a long horizontal arm extending from the front bumper along said direction to the panel with a vertical arm extending upward from the horizontal arm and pivotally secured at its upper end to the member, said vertical arm being heavily padded;
a first linkage pivotally secured at one end to a point on the horizontal arm intermediate bumper and vertical leg, said linkage extending inclinedly downward and being pivotally secured at its other end to the vehicle at a position below the horizontal arm;
a second linkage pivotally secured at a lower end to said pivot point and extending upward;
a third linkage pivotally secured at its upper end to the upper end of the second linkage and extending downward, the third linkage being pivotally secured at its lower end to the vehicle in a position normally above the horizontal arm; and
a fourth linkage pivotally secured at its upper end to the member in a position spaced from the vertical arm, the fourth linkage extending downward and being pivotally secured at its lower end to the upper ends of the second and third linkages.

2. The combination of claim 1 wherein the arms of the element are connected by a radius rather than a right angle.

3. The combination of claim 2 wherein said fourth linkage has the general shape of an S.

4. The combination of claim 3 wherein said first linkage is slightly curved.

* * * * *